United States Patent
Budampati et al.

(10) Patent No.: US 8,327,232 B2
(45) Date of Patent: Dec. 4, 2012

(54) APPARATUS AND METHOD FOR IMPROVED RELIABILITY OF WIRELESS COMMUNICATIONS USING PACKET COMBINATION-BASED ERROR CORRECTION

(75) Inventors: Ramakrishna S. Budampati, Maple Grove, MN (US); Arun V. Mahasenan, Kerala (IN); SrinivasaRao Katuri, Karnataka (IN); Alexander Chernoguzov, Warrington, PA (US)

(73) Assignee: Honeywell International Inc., Morristown, NJ (US)

( * ) Notice: Subject to any disclaimer, the term of this patent is extended or adjusted under 35 U.S.C. 154(b) by 871 days.

(21) Appl. No.: 12/426,681

(22) Filed: Apr. 20, 2009

(65) Prior Publication Data

US 2010/0269005 A1  Oct. 21, 2010

(51) Int. Cl.
*G06F 11/00* (2006.01)
(52) U.S. Cl. ...................... 714/776; 714/746
(58) Field of Classification Search .............. 714/776, 714/746, 748–751
See application file for complete search history.

(56) References Cited

U.S. PATENT DOCUMENTS

| 2006/0209709 A1* | 9/2006 | Kovacevic | 370/252 |
| 2007/0274215 A1* | 11/2007 | Gusat et al. | 370/235 |
| 2009/0276673 A1* | 11/2009 | Kone et al. | 714/749 |
| 2010/0223523 A1* | 9/2010 | Dinan et al. | 714/749 |

OTHER PUBLICATIONS

Elisabeth Uhlemann, et al., "Hard Decision Packet Combining Methods for Industrial Wireless Relay Networks", 2008 IEEE, p. 104-108.
Allen Miu, et al., "Improving Loss Resilience with Multi-Radio Diversity in Wireless Networks", MobiCom 05, Aug. 28-Sep. 2, 2005, Cologne, Germany, 15 pages.
Henri Dubois-Ferriere, et al., "Packet Combining in Sensor Networks", SenSys 05, Nov. 2-4, 2005, San Diego, California, p. 102-115.

\* cited by examiner

*Primary Examiner* — Dieu-Minh Le

(57) ABSTRACT

Various techniques are disclosed for improved reliability of wireless communications using packet combination-based error correction. For example, a method includes receiving a first message transmitted wirelessly, where the first message contains a first copy of a data packet and has at least one error. The method also includes receiving a second message transmitted wirelessly, where the second message contains a second copy of the data packet and has at least one error. The method further includes identifying a set of bit positions based on where the first and second copies of the data packet differ and modifying the set of bit positions to produce a modified set of bit positions. In addition, the method includes modifying one or more bit values in the modified set of bit positions to produce at least one modified copy of the data packet and determining if the at least one modified copy of the data packet is error-free.

21 Claims, 11 Drawing Sheets

US 8,327,232 B2

APPARATUS AND METHOD FOR IMPROVED RELIABILITY OF WIRELESS COMMUNICATIONS USING PACKET COMBINATION-BASED ERROR CORRECTION

TECHNICAL FIELD

This disclosure relates generally to wireless communication systems. More specifically, this disclosure relates to an apparatus and method for improved reliability of wireless communications using packet combination-based error correction.

BACKGROUND

Reliability is often a key requirement when it comes to using wireless networks in critical systems. For example, in industrial control systems, wireless sensors could transmit process variable data to access points throughout an industrial facility. The process variable data may be required for safe and effective control of an industrial process. The reliability of the wireless transmissions therefore typically needs to be high so that the necessary process variable data can be collected and used to control the industrial process.

In some conventional wireless sensor networks, an access point that successfully receives a data packet from a wireless sensor transmits an acknowledgement, and the wireless sensor need not retransmit the data packet. However, if the access point determines that the data packet has errors, the access point does not send the acknowledgement, and the wireless sensor retransmits the data packet. If a specified number of retransmissions fail, the wireless sensor can drop the data packet.

SUMMARY

This disclosure provides an apparatus and method for improved reliability of wireless communications using packet combination-based error correction.

In a first embodiment, a method includes receiving a first message transmitted wirelessly, where the first message contains a first copy of a data packet and has at least one error. The method also includes receiving a second message transmitted wirelessly, where the second message contains a second copy of the data packet and has at least one error. The method further includes identifying a set of bit positions based on where the first and second copies of the data packet differ and modifying the set of bit positions to produce a modified set of bit positions. Moreover, the method includes modifying one or more bit values in the modified set of bit positions to produce at least one modified copy of the data packet. In addition, the method includes determining if the at least one modified copy of the data packet is error-free.

In a second embodiment, an apparatus includes a plurality of wireless radios each configured to receive a message containing a copy of a data packet. The apparatus also includes a controller configured to produce an error-free copy of the data packet using multiple copies of the data packet received by multiple ones of the wireless radios.

In a third embodiment, a computer readable medium embodies a computer program. The computer program includes computer readable program code for receiving a first message, where the first message contains a data packet. The computer program also includes computer readable program code for receiving a second message, where the second message contains a portion of the data packet. The computer program further includes computer readable program code for producing an error-free copy of the data packet by combining the data packet from the first message and the portion of the data packet from the second message.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
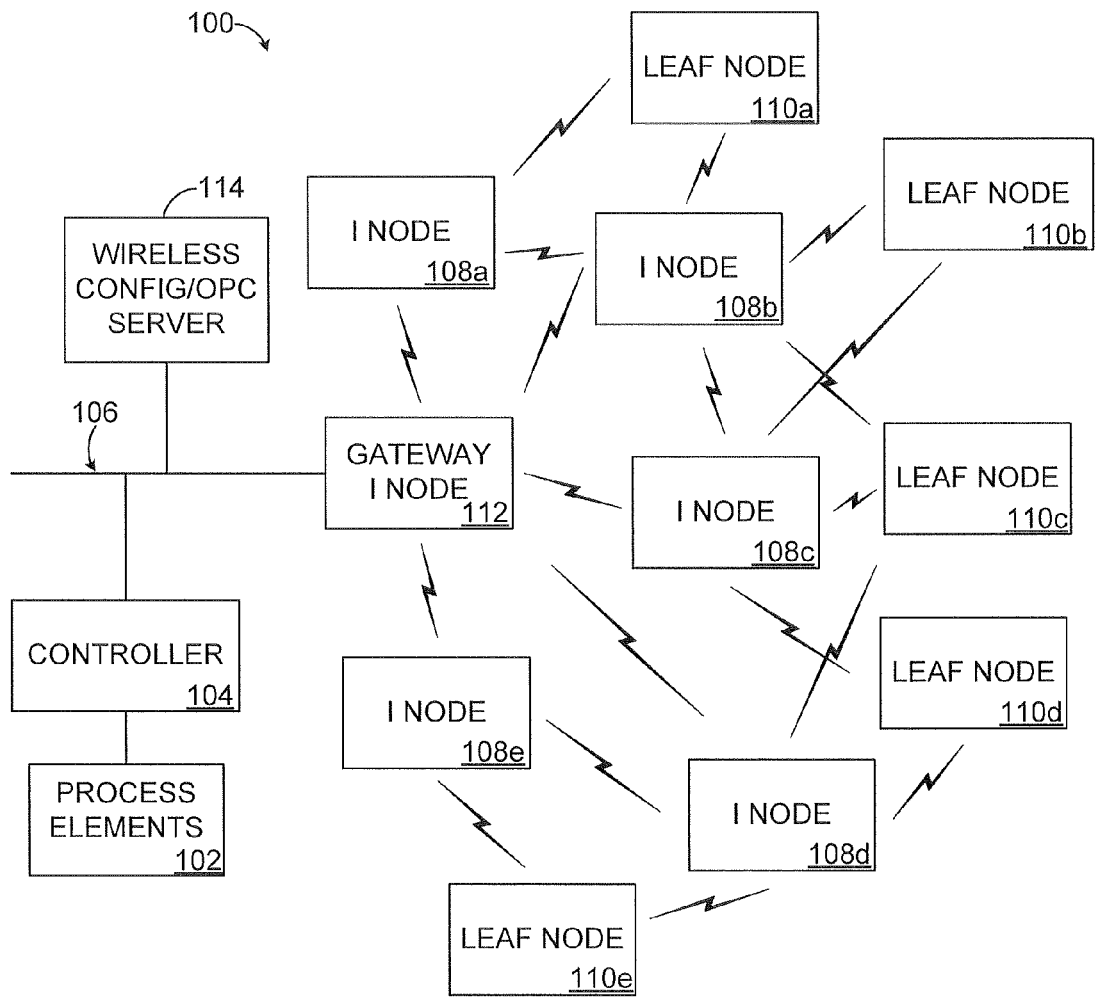
FIG. 1 illustrates an example industrial control and automation system according to this disclosure.

FIG. 1 illustrates an example industrial control and automation system 100 according to this disclosure. In this example embodiment, the industrial control and automation system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102 such as actuators, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system or any suitable real time operating system (RTOS).

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the industrial control and automation system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the infrastructure nodes 108a-108e form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent access point/routing devices that can store and forward messages for other devices. Infrastructure nodes 108a-108e are typically line-powered, meaning these nodes receive operating power from an external source. Infrastructure nodes 108a-108e are typically not limited in their operations since they need not minimize power consumption to increase the operational life of their internal power supplies. On the other hand, the leaf nodes 110a-110e are generally non-routing devices that do not store and forward messages for other devices. Leaf nodes 110a-110e typically represent devices powered by local power supplies, such as nodes that receive operating power from internal batteries or other internal power supplies. Leaf nodes 110a-110e are often more limited in their operations in order to help preserve the operational life of their power supplies.

The nodes 108a-108e and 110a-110e include any suitable structures facilitating wireless communications, such as radio frequency (RF) frequency-hopping spread spectrum (FHSS) or direct sequence spread spectrum (DSSS) transceivers. The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the wireless network. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e may also include any of the functionality of the leaf nodes 110a-110e or the controller 104.

The gateway infrastructure node 112 communicates wirelessly with, transmits data to, and receives data from one or more infrastructure nodes and possibly one or more leaf nodes. The gateway infrastructure node 112 may also convert data between protocol(s) used by the network 106 and protocol(s) used by the nodes 108a-108e and 110a-110e. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes or leaf nodes, thus providing versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the industrial control and automation system 100. For example, the server 114 could configure the operation of the nodes 108a-108e, 110a-110e, and 112. The server 114 could also support security in the industrial control and automation system 100, such as by distributing cryptographic keys or other security data to various components in the industrial control and automation system 100 (like the nodes 108a-108e, 110a-110e, and 112). The server 114 includes any hardware, software, firmware, or combination thereof for configuring wireless networks and providing security information.

In one aspect of operation, each leaf node 110a-110e may communicate with one or more access points (the infrastructure nodes 108a-108e, 112). When a leaf node transmits a data packet, each infrastructure node that receives the packet can determine if one or more errors are present in the packet, such as by performing a cyclic redundancy check (CRC) on the packet. If the packet is received successfully (without errors), the infrastructure node can transmit an acknowledgement to the leaf node. As long as one infrastructure node successfully receives the data packet and transmits an acknowledgement, the leaf node may not need to retransmit the data packet.

In some embodiments, the infrastructure node includes a single antenna and receives a single copy of a transmitted data packet. In these embodiments, if an error is detected in the data packet, the infrastructure node may not send an acknowledgement, or the infrastructure node could send an acknowledgement indicating that the data packet contained errors. In response, the leaf node can retransmit at least part of the data packet to the infrastructure node again. The infrastructure node could receive the second transmitted packet and combine portions of the first and second transmitted packets to form a complete (error-free) data packet. In other embodiments, the infrastructure node includes multiple antennas and receives multiple copies of the transmitted data packet at the same time. In these embodiments, the infrastructure node could combine different parts of different copies of the transmitted packet to form a complete (error-free) data packet. Example techniques for combining packets to form a complete error-free packet are described below. In this document, the phrases "packet" and "data packet" refer to any message containing data that is transmitted wirelessly and that is to be delivered to at least one destination.

Although FIG. 1 illustrates an example industrial control and automation system 100, various changes may be made to FIG. 1. For example, the industrial control and automation system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where packet combination-based error correction can be used. This functionality could be used in any other suitable system (whether or not process control-related).

Figure 2A:
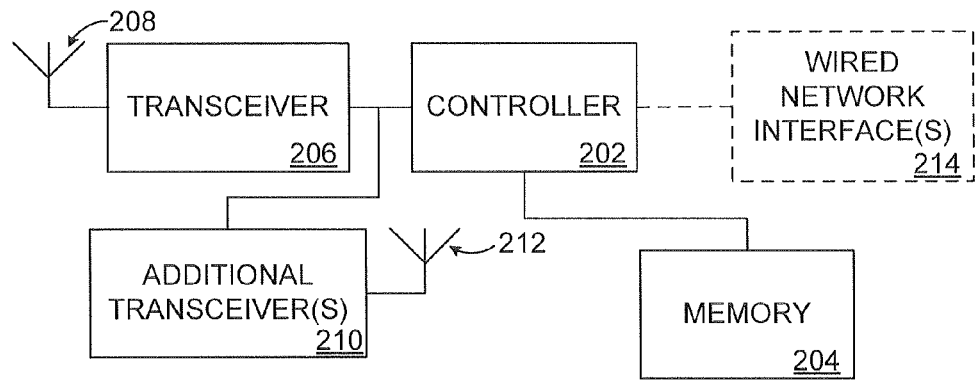
FIGS. 2A and 2B illustrate an example wireless node in a wireless network according to this disclosure.
Figure 2B:
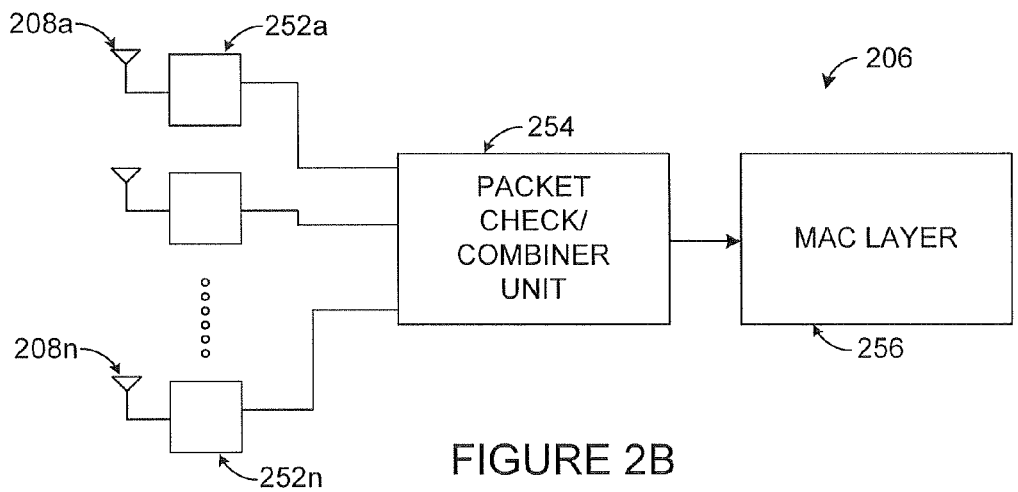

FIGS. 2A and 2B illustrate an example wireless node 200 in a wireless network according to this disclosure. The wireless node 200 could, for example, represent an infrastructure node or gateway infrastructure node in the system 100 of FIG. 1.

As shown in FIG. 2A, the node 200 includes a controller 202, which controls the overall operation of the node 200. For example, the controller 202 may receive or generate data to be transmitted, and the controller 202 could provide the data to other component(s) in the node 200 for transmission over a wired or wireless network. The controller 202 could also receive data over a wired or wireless network and use or forward the data. As a particular example, the controller 202 in an infrastructure node could receive data transmitted wirelessly, determine a next hop for the data (if any), and provide the data for transmission to the next hop (if any). As another example, the controller 202 in a gateway infrastructure node could receive data from a wired network and provide the data for wireless transmission (or vice versa). The controller 202 includes any hardware, software, firmware, or combination thereof for controlling operation of a wireless node. As particular examples, the controller 202 could represent a processor, microprocessor, microcontroller, field programmable gate array, digital signal processor, or other processing or control device.

A memory 204 is coupled to the controller 202. The memory 204 stores any of a wide variety of information used, collected, or generated by the node 200. For example, the memory 204 could store information received over a network that is to be transmitted over the same or other network. The memory 204 includes any suitable volatile and/or non-volatile storage and retrieval device(s).

The node 200 also includes a wireless transceiver 206 coupled to an antenna 208. The transceiver 206 and antenna 208 can be used to communicate wirelessly with one or more leaf nodes and possibly one or more other infrastructure nodes. One or more additional transceivers 210 could also be used in the wireless node 200, such as to communicate with Wi-Fi or IEEE 802.11 devices (like wireless controllers or hand-held user devices) or other infrastructure or gateway infrastructure nodes. The additional transceivers 210 may be coupled to their own antennas 212 or share one or more common antennas (such as antenna 208). Each transceiver includes any structure(s) for providing signals for wireless transmission and/or obtaining signals received wirelessly. Each antenna represents any structure(s) for transmitting and/or receiving wireless signals. In some embodiments, each transceiver represents an RF transceiver, such as an RF FHSS or DSSS transceiver. Also, each antenna could represent an RF antenna. It may be noted that any other suitable wireless signals could be used to communicate. In addition, each transceiver could include a transmitter and a separate receiver.

If the node 200 represents a gateway infrastructure node, the node 200 may further include one or more wired network interfaces 214. The wired network interfaces 214 allow the node 200 to communicate over one or more wired networks, such as the network 106. Each wired network interface 214 includes any suitable structure for transmitting and/or receiving signals over a wired network, such as an Ethernet interface.

As shown in FIG. 2B, the transceiver 206 may communicate through one or multiple antennas 208a-208n. The one or more antennas 208a-208n in this example are coupled to one or more wireless radios 252a-252n. The wireless radios 252a-252n receive wireless signals from one or more external components (such as leaf nodes), demodulate the data contained in the wireless signals, and output the data. Each of the wireless radios 252a-252n includes any suitable structure for processing received wireless signals and optionally for providing outgoing signals for wireless transmission.

Data packets received and demodulated by one or more wireless radios 252a-252n are passed to a packet check/combiner unit 254. When a single antenna 208a and wireless radio 252a are used, a leaf node transmits a data packet to the wireless node 200, such as in a time slot assigned to that leaf node. The packet check/combiner unit 254 determines whether the packet is valid, such as by performing CRC calculations to determine if any errors are present in the packet. If the packet is valid (error-free), the data packet can be output, and an acknowledgement is sent to the leaf node via the radio 252a and antenna 208a. If the packet is not valid, the erroneous packet could be stored (such as in a buffer) for packet combination-based error correction purposes. Also, the packet check/combiner unit 254 could take steps to receive a re-transmission from the leaf node, where the re-transmission includes another copy of the original data packet or one or more portions of the original data packet. The packet check/combiner unit 254 could then combine different portions of the two copies of the data packet to obtain an error-free copy of the packet. If the packet check/combiner unit 254 can construct a valid copy of the data packet, an acknowledgement can be sent to the leaf node. Otherwise, the packet check/combiner unit 254 could take steps to receive another re-transmission from the leaf node, where the second re-transmission includes another copy of the original data packet or one or more portions of the original data packet. The packet check/combiner unit 254 could then combine different portions of the three copies of the data packet to obtain an error-free copy of the packet.

When multiple antennas 208a-208n and wireless radios 252a-252n are used, the transceiver 206 could receive multiple copies of a data packet that is transmitted once by a leaf node. As a result, the packet check/combiner unit 254 can determine whether any of the copies is error-free. If so, an error-free copy of the data packet is output. Otherwise, the erroneous copies of the packet can be stored (such as in a buffer), and the packet check/combiner unit 254 can determine whether different portions of different copies can be combined to form an error-free data packet. If no error-free data packet can be constructed using copies of the transmitted packet, the infrastructure node could take steps to receive one or more re-transmissions from the leaf node, and the packet check/combiner unit 254 can attempt to construct an error-free packet using the erroneous stored copies of the two or more transmitted packets.

Note that the use of three transmissions is for illustration only. Two or more than three transmissions associated with a single data packet could also be used. Also note that the packet reconstruction technique performed by the packet check/combiner unit 254 may only be needed if no valid copy of a packet is received by the wireless node 200. For example, if the re-transmission of a complete packet is successful and the packet is received without errors at the wireless node 200, there may be no need for the packet check/combiner unit 254 to engage in any packet reconstruction operations. The packet reconstruction may only be needed when a complete error-free copy of a data packet is not received from a leaf node.

The packet check/combiner unit 254 includes any hardware, software, firmware, or combination thereof for checking the validity of data packets and reconstructing valid data packets. The packet check/combiner unit 254 could, for example, represent a microprocessor, microcontroller, field programmable gate array, digital signal processor, or other processing or control device.

Valid packets output by the packet check/combiner unit 254 are provided to a medium access control (MAC) layer 256 of the transceiver 206. There, the data packets can be further processed before being provided, for example, to the controller 202 in the transceiver 206.

Although FIGS. 2A and 2B illustrate an example wireless node 200 in a wireless network, various changes may be made to FIG. 2. For example, various components in FIG. 2 could be combined, subdivided, or omitted and additional components could be added according to particular needs. Also, a "wireless node" represents any device that can transmit and/or receive data wirelessly, even if the "wireless node" has the ability to transmit and/or receive data over a wired connection as well.

Figure 3:
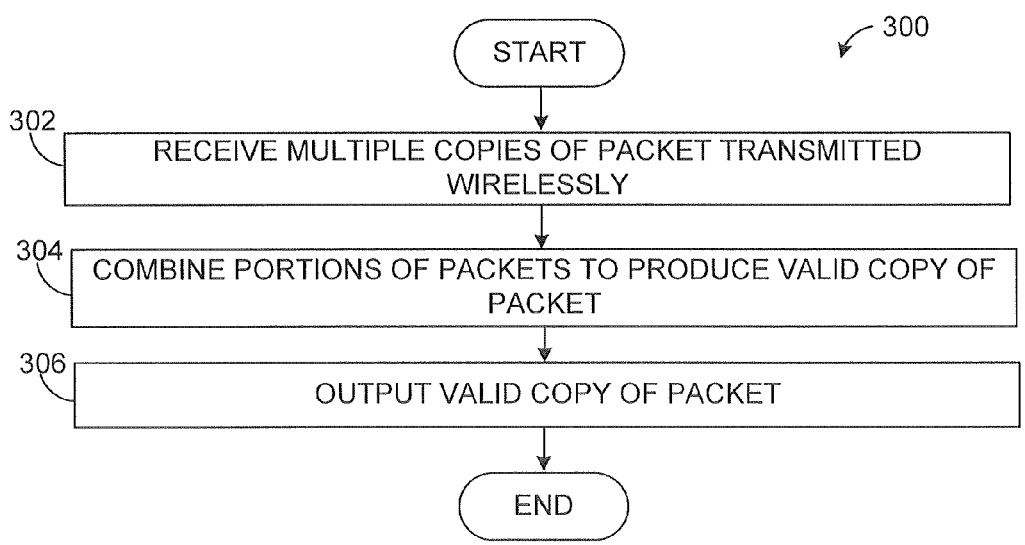
FIG. 3 illustrates an example method for improved reliability of wireless communications using packet combination-based error correction according to this disclosure.

FIG. 3 illustrates an example method 300 for improved reliability of wireless communications using packet combination-based error correction according to this disclosure. As shown in FIG. 3, multiple copies of a packet transmitted wirelessly are received at step 302. This could include, for example, receiving multiple copies of a complete data packet, where each copy includes one or more errors. The copies of the complete data packet could be transmitted from a leaf node sequentially, or the copies could be captured based on a single transmission from the leaf node. This could also include receiving copies that contain different amounts of data, such as when the first copy represents a copy of a complete data packet and the second copy contains only part of the data packet. Portions of the multiple copies are combined to produce a valid copy at step 304, and the valid copy is output at step 306. Various techniques for combining multiple portions of a data packet to produce a valid copy of the data packet are described below.

FIGS. 4 through 13 illustrate example techniques and related details for improved reliability of wireless communications using packet combination-based error correction according to this disclosure. These techniques are for illustration only.

Figure 4:
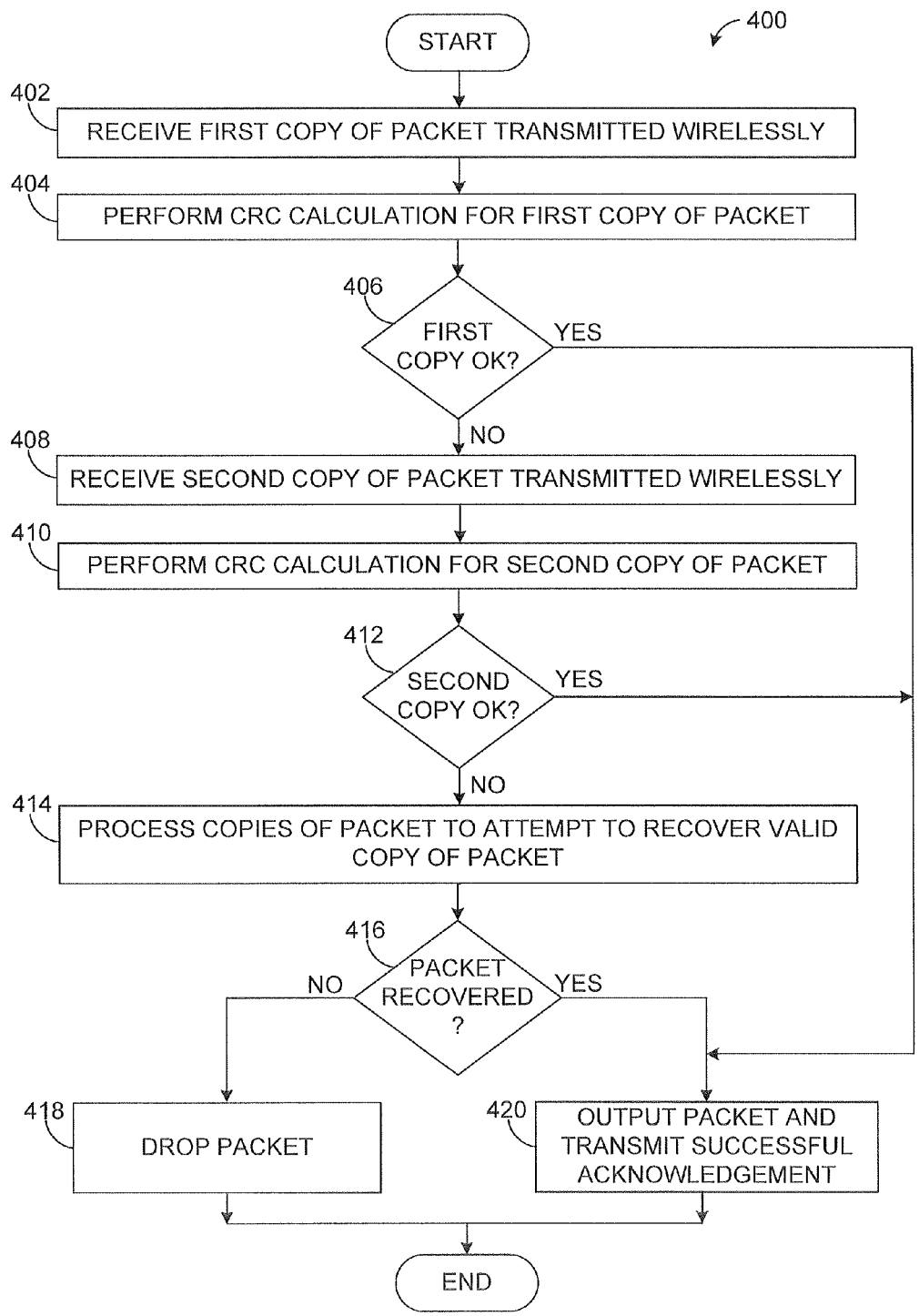
FIGS. 4 through 13 illustrate example techniques and related details for improved reliability of wireless communications using packet combination-based error correction according to this disclosure.

FIG. 4 illustrates an example method 400 for packet combination-based error correction that involves using multiple copies of a complete data packet. A first copy of the complete data packet is received at step 402, and CRC or other error-correction calculations are performed at step 404. If the first copy of the packet is acceptable (error-free) at step 406, the first copy of the packet is output and a successful acknowledgement is transmitted at step 420. In this case, there is no need to perform any type of packet combination-based error correction. If the first copy of the packet is not acceptable, the first copy can be stored, and a second copy of the complete data packet is received at step 408, CRC or other error-correction calculations are performed at step 410, and a determination is made whether the second copy of the packet is acceptable at step 412. If the second copy of the packet is acceptable, the second copy of the packet is output and a successful acknowledgement is transmitted at step 420, and again there is no need to perform any type of packet combination-based error correction.

If both copies of the packet contain errors, the copies are processed in an attempt to recover a valid copy of the data packet at step 414. Example techniques and details for processing the copies are shown in FIGS. 5 through 9C, which are described below. Whether a recovered copy is valid can be determined by performing CRC or other error-correction calculations. If a valid copy of the packet is not recovered at step 416, the packet is dropped at step 418. Otherwise, the recovered copy of the packet is output and a successful acknowledgement is transmitted at step 420. Note that while FIG. 4 shows dropping the packet after two transmissions of the packet have been made, the method 400 could proceed from the "No" branch of step 416 back to step 408 to receive one or more additional copies of the packet. In this case, step 414 could include attempting to construct a valid copy of the packet using three or more copies of the data packet.

Figure 5:
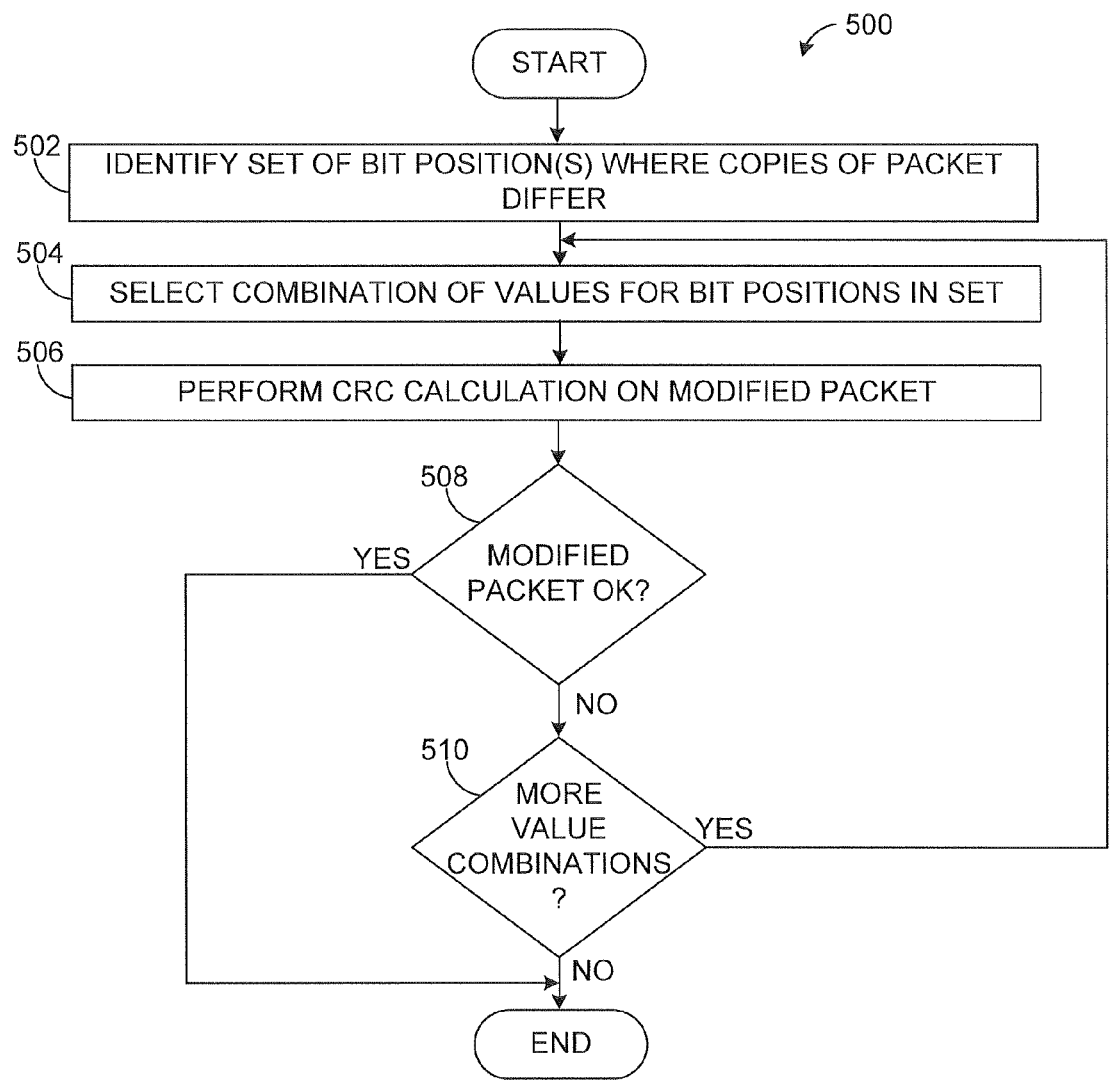

FIG. 5 illustrates an example method 500 for processing multiple copies of a complete data packet in an attempt to recover a valid copy of the data packet. In particular embodiments, CRC calculations are performed as part of the packet verification process. In CRC-16 calculations, $D(x)$ represents a data polynomial, and $P(X)$ represents a primitive polynomial. Also, $F(X)$ represents a remainder and is equal to $D(X) \% P(X)$. Transmitted data can be expressed as $x^{15}*D(X)+F(X)$, and received data $R(X)$ can be expressed as $x^{15}*D(X)+F(X)+E(X)$, where $E(X)$ represents an error vector. The CRC check can be expressed as $G(X)=R(X)/P(X)$, and the error vector $E(X)$ is zero if $G(X)$ is zero.

In FIG. 5, multiple copies of a data packet have been received, and each received packet includes at least one error. A set of bits where two copies of a data packet differ is identified at step 502. This could include, for example, performing an XOR operation using two copies of a data packet to produce a set of bit locations $B(x)$. This can be expressed as $B(x)=R1(x)^{\wedge}R2(x)$, where $R1(x)$ and $R2(x)$ denote the two copies of the packet. The XOR result identifies any bit positions that differ between the two copies of the packets. This step can also include using the CRC calculations along with the XOR result to identify possible "hidden" bit errors. A "hidden" bit error occurs when multiple copies of a packet have an error in the same bit position. In that case, an XOR operation would not identify that bit position as being possibly erroneous. The combination of the bits identified using the XOR operation and the bits identified as containing possible hidden errors represent a set of bit positions where errors may have occurred in at least one copy of the data packet.

The identified bit positions have a finite set of values that could occupy those positions. For example, n bits could have $2^n$ possible values. In the method 500, different ones of these values are selected, inserted into a copy of the data packet, and used to see if a valid data packet can be recovered. As a particular example, suppose two copies of a data packet differ only in two bit positions and have no hidden errors detected. Four possible bit values could be used in those bit positions (00, 01, 10, 11), so different combinations of values can be inserted into those bit positions until either (i) a valid packet is created or (ii) all combinations of values have been tried.

A combination of values for the identified bit positions is selected at step 504, and CRC or other error-correction calculations are performed using the selected combination of values at step 506. As an example, the first combination of values could be all zeros, although any initial value and all subsequent combinations of values could be selected in any suitable manner. If the modified packet (one copy of the packet with the selected combination of values) is acceptable at step 508, the selected combination of values for the identified bit positions have restored the packet, so the method 500 ends. At this point, the recovered packet can be output, and an acknowledgement can be sent. Otherwise, a determination is made whether additional combinations of values in the identified bit positions remain to be tested at step 510. If so, the method 500 returns to step 504 to select another combination of values. If not, the method 500 ends without recovering a valid copy of the data packet.

Note that this is a type of "brute force" approach, where possible combinations of bit values are used until either a valid packet is recovered or all combinations have been used. With a wireless channel that has a relatively low bit error rate (such as $10^{-3}$ or better), the number of bits having different values in two copies of a packet may be relatively small.

Some techniques can also be used to reduce the computational intensity of this approach. For example, different values of G(X) (such as G1(x) and G2(x)) and different values of B(x) (produced using different pairs of data packet copies) can be combined to reduce the number of iterations needed.

Figure 6:
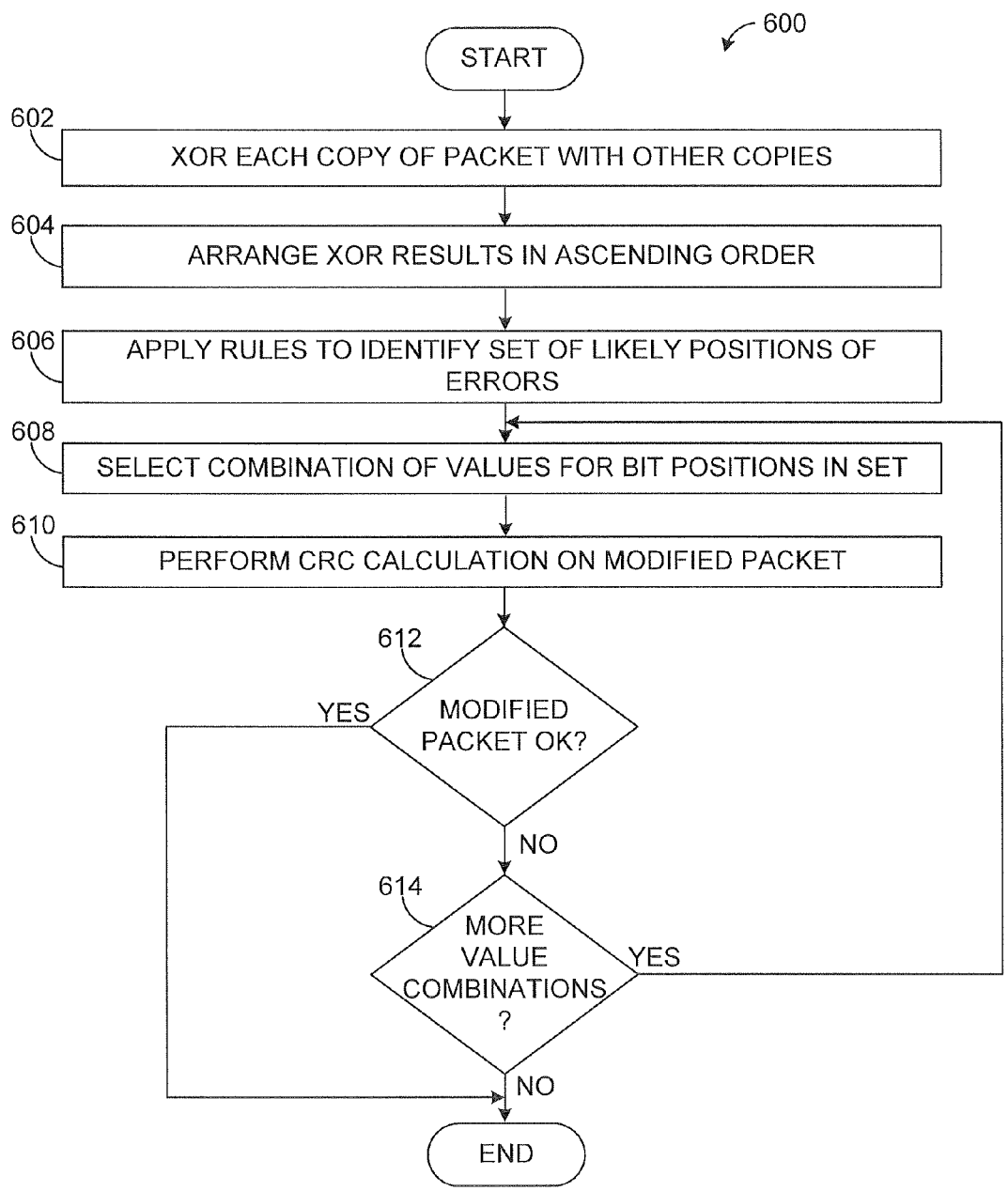

FIG. 6 illustrates another example method 600 that can be used to reduce the intensity of the packet recovery scheme. In FIG. 6, additional XOR operations are used to first narrow the number of bit positions that are likely to contain errors. Once the number of bit positions has been narrowed, different combinations of values can be inserted into those bit positions, and CRC or other error-correction calculations can be performed to determine which combination (if any) is correct. This approach may be less computationally intense than the "brute force" approach since XOR operations require less processing power than CRC calculations.

As shown in FIG. 6, XOR operations are performed at step 602. Each XOR operation involves two copies of a data packet, and each copy of the data packet may be XORed against all other copies of the data packet. For example, if three copies of a data packet (R1(x), R2(x), R3(x)) are received, three XOR results (R1(x)^R2(x), R1(x)^R3(x), R2(x)^R3(x)) can be produced. The XOR results are arranged in ascending order at step 604. For instance, each XOR result identifies the number and positions of possible errors, and the XOR results could be arranged in order of increasing error number.

Rules are applied to the XOR results to identify a set of bit positions where errors are likely at step 606. Steps 608-614 may then be performed in the same or similar manner at steps 504-510 in FIG. 5, where a brute force approach is applied to the identified set of bit positions. However, by using the rules in step 606, the number of combinations to be tested can be drastically reduced.

Any suitable rules can be applied in step 606. For example, one rule may state that if toggling a bit value reduces the number of ones in an XOR result, the bit's position can be added to the set of possible error positions (unless the number of errors is reduced below a known number of errors). Consider the following example:

Transmitted Data=10100011
First Received Copy (C1)=10101011
Second Received Copy (C2)=10101111
Third Received Copy (C3)=10100001.

Three XOR results can be calculated and ordered as follows:
X1=C1^C2=00000100 (one error, 6th position)
X2=C1^C3=00001010 (two errors, 5th and 7th positions)
X3=C2^C3=00001110 (three errors, 5th-7th positions).

Start with the first sorted XOR result X1, which shows one error in the 6th bit position. Toggling the bit in the 6th bit position of C1 produces:
C1'=10101111.
XOR operations of C1' with C2 and C3 produces:
X1'=C1'^C2=00000000 (no errors)
X2'=C1'^C3=00001110 (three errors).
It is known that at least one error exists in C2, and the number of errors between C1' and C3 has increased (X2'>X2). As a result, the 6th bit position is not a likely error position.

Now move on to the second sorted XOR result X2, which shows two errors in the 5th and 7th bit positions. Modifying the 5th bit position in C1 produces:
C1"=10100011.
XOR operations of C1" with C2 and C3 produces:
X1"=C1"^C2=00001100 (two errors)
X2"=C1"^C3=00000010 (one error).
The number of errors between C1" and C2 has increased (X1">X1), but the number of errors between C1" and C3 has decreased from two to one (X2"<X2). As a result, the 5th bit position is a possible position for an error.

Modifying the 7th bit position in C1 produces:
C1'''=10101001.
XOR operations of C1''' with C2 and C3 produces:
X1'''=C1'''^C2=00001100 (two errors)
X2'''=C1'''^C3=00000010 (one error).
Again, the number of errors between C1''' and C2 has increased (X1'''>X1), but the number of errors between C1''' and C3 has decreased from two to one (X2'''<X2). As a result, the 7th bit position is another possible position for an error.

The third sorted XOR result X3 (showing errors in the 5th-7th bit positions) can be skipped since those bit positions have already been tested. If X3 identified more positions, those bit positions could be tested as described above. As shown here, the initial XOR results showed a maximum of three errors between the different copies of the data packet, which could have required 2³ or eight possible combinations to be examined. The rules-based analysis above has reduced that number to 2² or four possible combinations, which eliminates four possible sets of CRC calculations while using only six XOR operations and related toggling and logic operations.

Consider another example:
Transmitted Data=10100011
First Received Copy (C1)=10100001
Second Received Copy (C2)=10101001
Third Received Copy (C3)=10101111.

Three XOR results can be calculated and ordered as follows:
X1=C1^C2=00001000 (one error, 5th position)
X3=C2^C3=00000110 (two errors, 6th and 7th positions)
X2=C1^C3=00001110 (three errors, 5th-7th positions).

Start with the first sorted XOR result X1, which shows one error in the 5th bit position. Toggling the bit in the 5th bit position of C1 produces:
C1'=10101001.
XOR operations of C1' with C2 and C3 produces:
X1'=C1'^C2=00000000 (no errors).
X2'=C1'^C3=00000110 (two errors).
While the number of errors between C1' and C3 has been reduced (X2'<X2), the XOR result X1' is not correct since it is known that at least one error exists in C2. As a result, the 5th bit position is not a likely error position.

Now move on to the second sorted XOR result X3, which shows two errors in the 6th and 7th bit positions. Modifying the 6th bit position in C1 produces:
C1"=10100101.

XOR operations of C1" with C2 and C3 produces:
X1"=C1"^C2=00001100 (two errors)
X2"=C1"^C3=00001010 (two errors).
The number of errors between C1" and C2 has increased (X1">X1), but the number of errors between C1" and C3 has decreased from three to two (X2"<X2). As a result, the 6th bit position is a possible position for an error.

Modifying the 7th bit position in C1 produces:
C1'''=10100011.
XOR operations of C1''' with C2 and C3 produces:
X1'''=C1'''^C2=00001010 (two errors)
X2'''=C1'''^C3=00001100 (two errors).
Again, the number of errors between C1''' and C2 has increased (X1'''>X1), but the number of errors between C1''' and C3 has decreased from three to two (X2'''<X2). As a result, the 7th bit position is another possible position for an error.

Once again, the third sorted XOR result X2 can be skipped since its bit positions have already been tested. And once again, the rules-based analysis has reduced the number of bits to be tested from three to two, cutting in half the number of CRC calculations to be performed.

Figure 7:
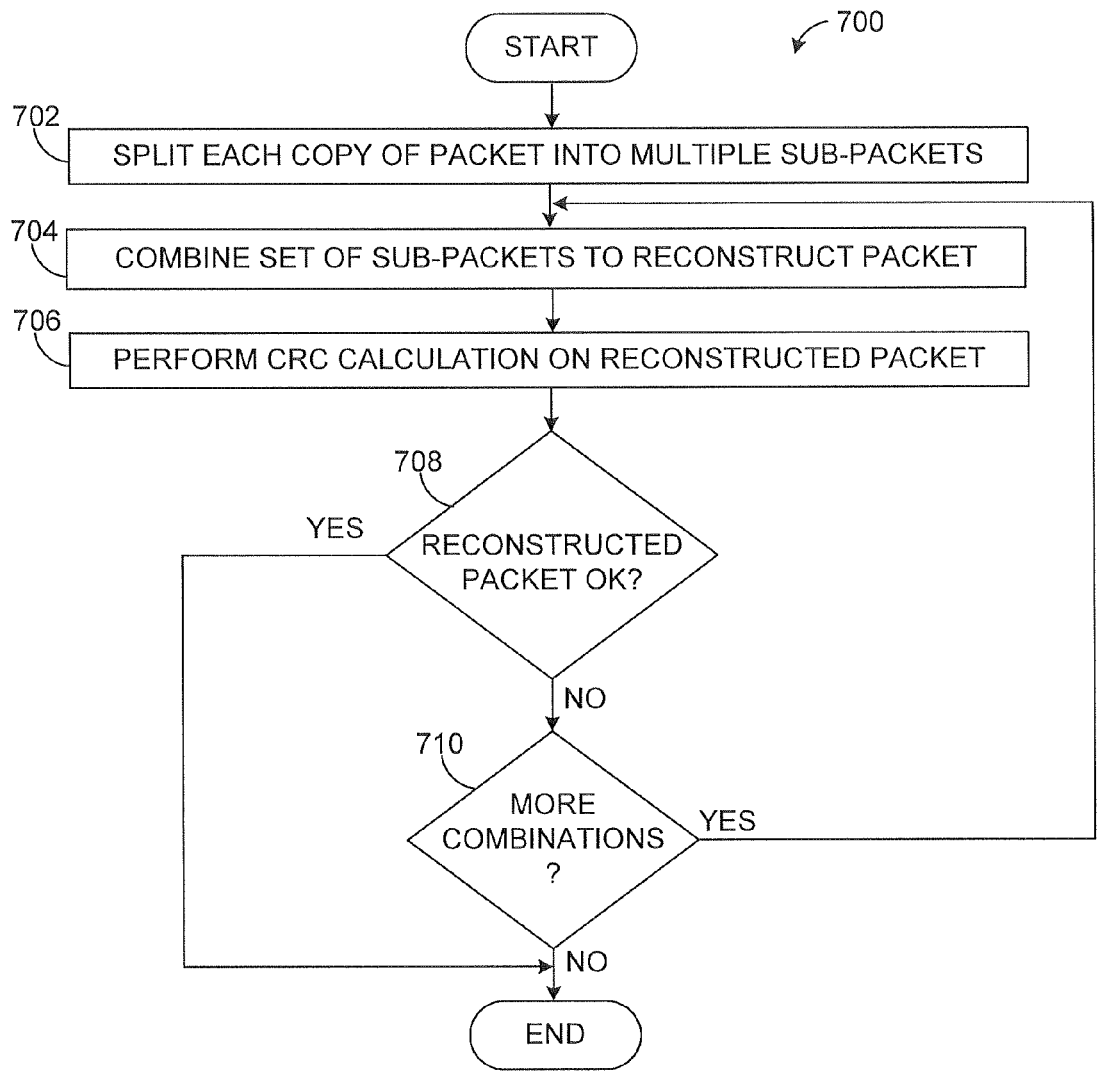
Figure 8:
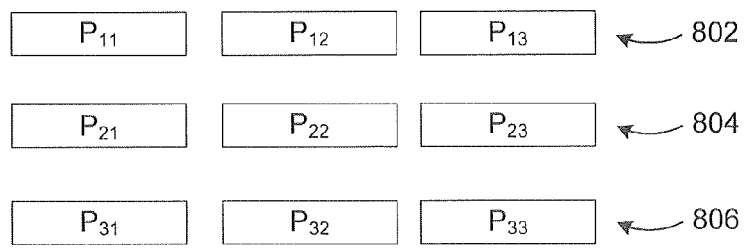

FIG. 7 illustrates another example method 700 for processing multiple copies of a complete data packet in an attempt to recover a valid copy of the data packet. In this example, multiple copies of a complete data packet have been received, and each copy includes one or more errors. The copies of the packet are split into sub-packets at step 702. This could include, for example, dividing copies of a 60-byte packet into three 20-byte sub-packets per copy. At this point, multiple combinations of sub-packets could be used to form a complete (although possibly invalid) packet. An example of this is shown in FIG. 8, where three packets have been divided into three sets 802-806 of sub-packets. One set of sub-packets is used to form a reconstructed packet at step 704, and CRC or other error-correction calculations are performed at step 706. If the reconstructed packet is acceptable at step 708, the method 700 ends. Otherwise, if additional combinations of sub-packets remain to be tested at step 710, the method 700 returns to step 704. If not, the method 700 ends without forming a valid packet.

Note that the number of possible combinations of sub-packets varies depending on the number of packet copies received and the number of sub-packets per copy. For n copies of a packet each divided into p sub-packets, the number of combinations to be tested could equal $n^p-n$ (the "−n" term is present since each original packet has already been tested and found to contain errors). If two copies of a packet have been received and divided into three sub-packets each, the number of unique combinations of sub-packets would equal eight. Two combinations (the original two packets) have already been tested and found to contain errors, so six additional combinations remain to be tested. If a valid packet cannot be obtained by testing those six combinations, a third copy of the packet may be received, which increases the number of unique combinations of sub-packets to 27. Of those 27 unique combinations of sub-packets, eight were already tested previously, and the original third copy is known to be invalid, so 19 possible combinations remain to be tested. Of course, the actual number of tested combinations can vary under the circumstances. It is possible that a valid packet would be found on the first tested combination of sub-packets, or all possible combinations of sub-packets could be tested without success.

Figure 9A:
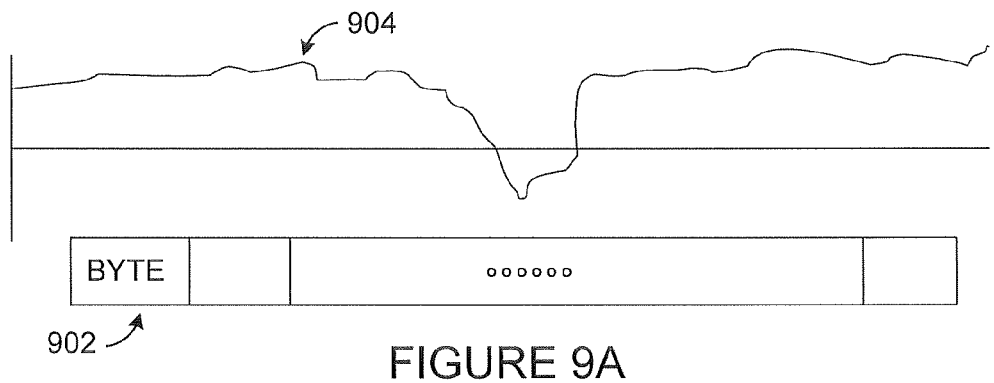
Figure 9B:
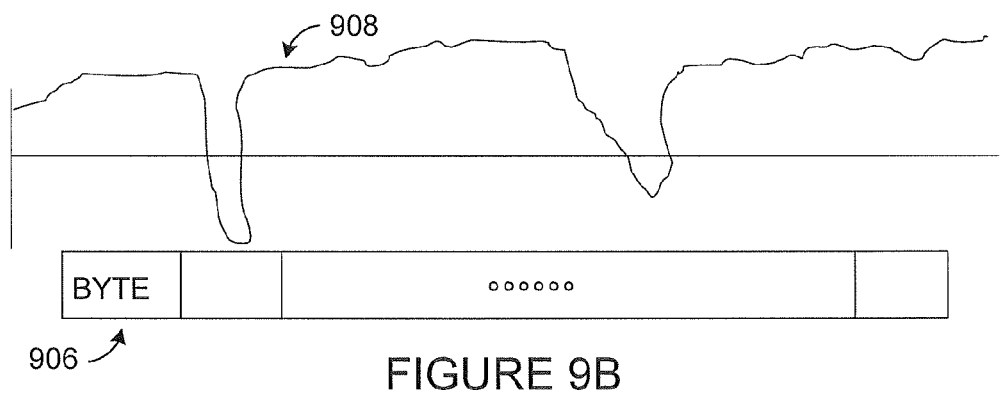
Figure 9C:
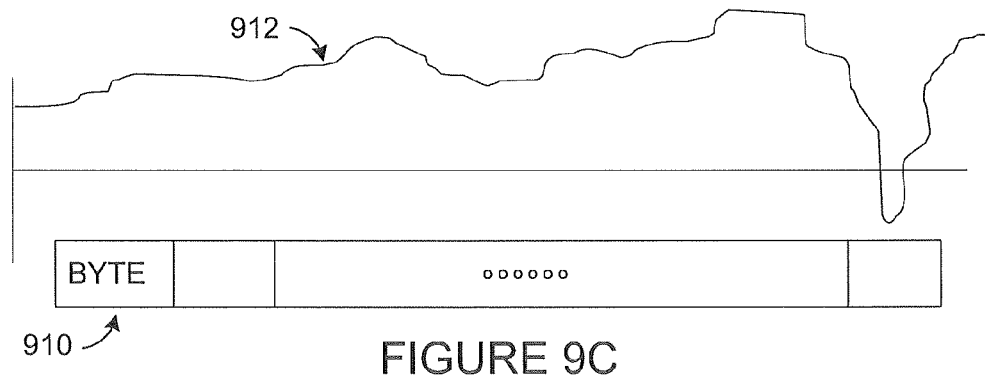

The method 700 shown in FIG. 7 may be well-suited for use in situations where transmissions can undergo random and independent fades. An example of this is shown in FIGS. 9A through 9C, which illustrate the transmission of a packet three times (as packets 902, 906, and 910). Each packet is formed from multiple bytes, and the packets are received at associated signal strengths 904, 908, and 912. As shown here, the different packets undergo fading at random times. In FIG. 9A, the packet 902 undergoes fading near the middle of its reception. In FIG. 9B, the packet 906 undergoes fading near the beginning and near the middle of its reception. In FIG. 9C, the packet 910 undergoes fading near the end of its reception. Since the fading is random and independent, a combination of sub-packets could be grouped together such that no sub-packets in the combination experienced fading during reception. In this example, for instance, the first two-thirds of the packet 910 could be combined with the first one-third of the packet 902.

While FIGS. 4 through 9C have involved the re-transmission of an entire data packet when a prior transmission was not successful, other techniques could be used. For example, in FIGS. 10 and 11, subsequent transmissions may involve only part of a data packet. If less data is transmitted during the subsequent transmissions, those subsequent transmissions can be done at a lower data rate. Under the same or any random channel condition, lower data rate packets can be more robust against fading compared to higher data rates or full packets, which can help to increase the likelihood that the subsequent transmissions will be received successfully. Lower data rate transmissions can also save energy used during the transmissions, which can help to extend the life of batteries or other power supplies.

Figure 10:
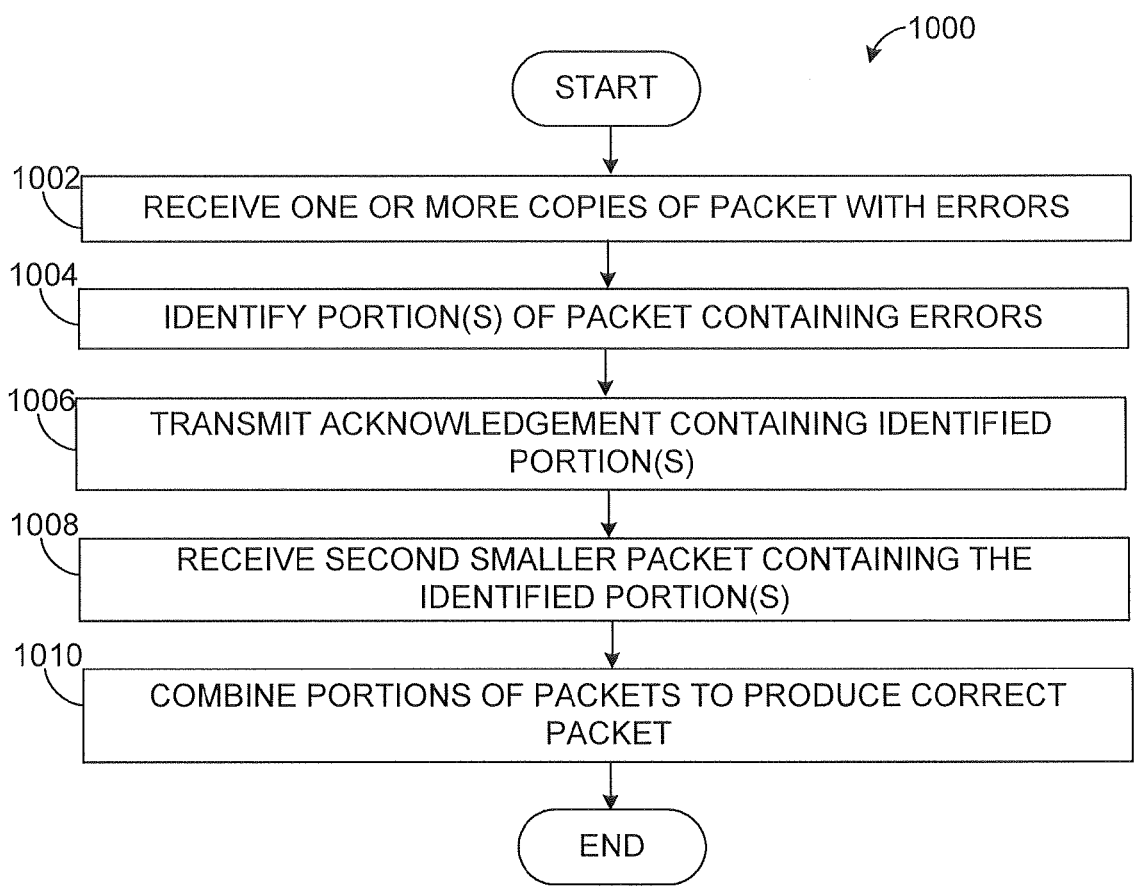

FIG. 10 illustrates an example method 1000 that involves re-transmitting smaller portions of a data packet. In FIG. 10, one or multiple copies of a packet containing errors are received at step 1002, and one or more portions of the data packet(s) that contain the errors are identified at step 1004. The portions of one or more data packets that contain errors could be identified in any suitable manner. For example, the results of prior CRC calculations and rules can be used to identify the part(s) of a received data packet containing the errors. As another example, XOR operations on multiple copies of a data packet can be used to identify likely error positions. However the likely error positions are identified, an acknowledgement or other message is transmitted to the leaf node at step 1006, where the message identifies those positions. The leaf node then responds by transmitting a smaller packet containing only those portions of the data packet that previously contained errors at step 1008. Assuming the smaller packet is received successfully, the contents of the smaller packet can be combined with the valid portions of the original packet to recover a valid packet at step 1010.

Figure 11:
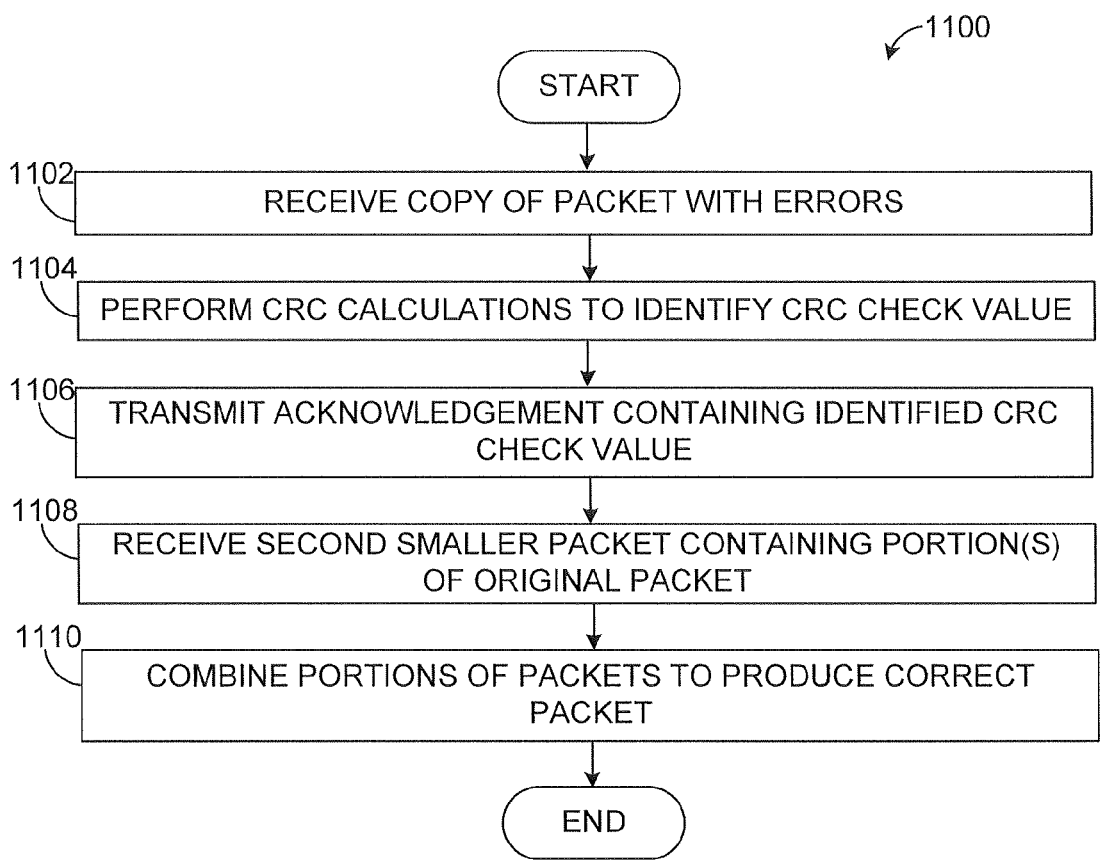

FIG. 11 illustrates another example method 1100 that involves re-transmitting smaller portions of a data packet. In FIG. 11, one or multiple copies of a packet containing errors are received a step 1102, and CRC or other error-correction calculations are performed at step 1104. As noted above, CRC calculations can involve computing G(X), which represents a CRC check. Here, the G(X) value is transmitted as part of an acknowledgement or other message at step 1106, which allows the leaf node to receive the G(X) value and use the G(X) value to estimate which portion(s) of the original data packet contained errors. The leaf node then responds by transmitting a smaller packet containing only those portions of the original packet that contained errors at step 1108. Assuming the smaller packet is received successfully, the contents of the smaller packet can be combined with the valid portions of the original packet to recover a valid packet at step 1110.

Figure 12:
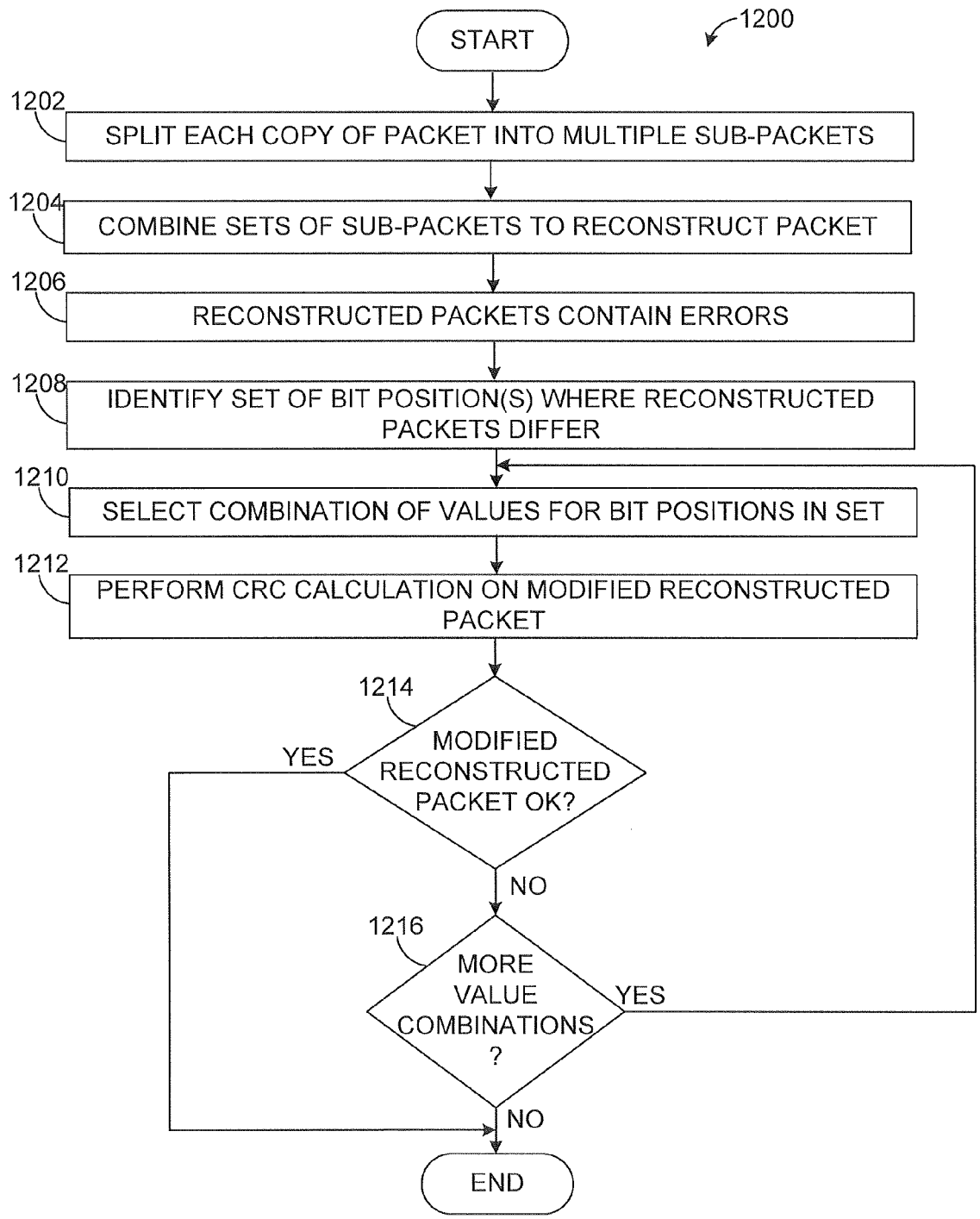

It is also possible to use a combination of different techniques in attempting to reconstruct a valid copy of a data packet. FIG. 12 illustrates an example method 1200 that combines sub-packet combination (as shown in FIG. 7) with brute-force bit value substitutions (as shown in FIG. 5). As shown in FIG. 12, multiple copies of a packet are split into sub-packets at step 1202, and multiple reconstructed packets are produced using the sub-packets at step 1204. A determination is made that the reconstructed packets still contain errors at step 1206. At this point, steps 1208-1216 can be used to identify bit positions where the multiple reconstructed packets differ, to substitute bit values into those positions, and determine if any substituted bit values help form a valid packet. This type of technique may be useful, for example, when burst errors randomly affect transmissions from a leaf node to its infrastructure node. This also reduces the computational complexity and is therefore suitable for delay-sensitive applications.

Figure 13:
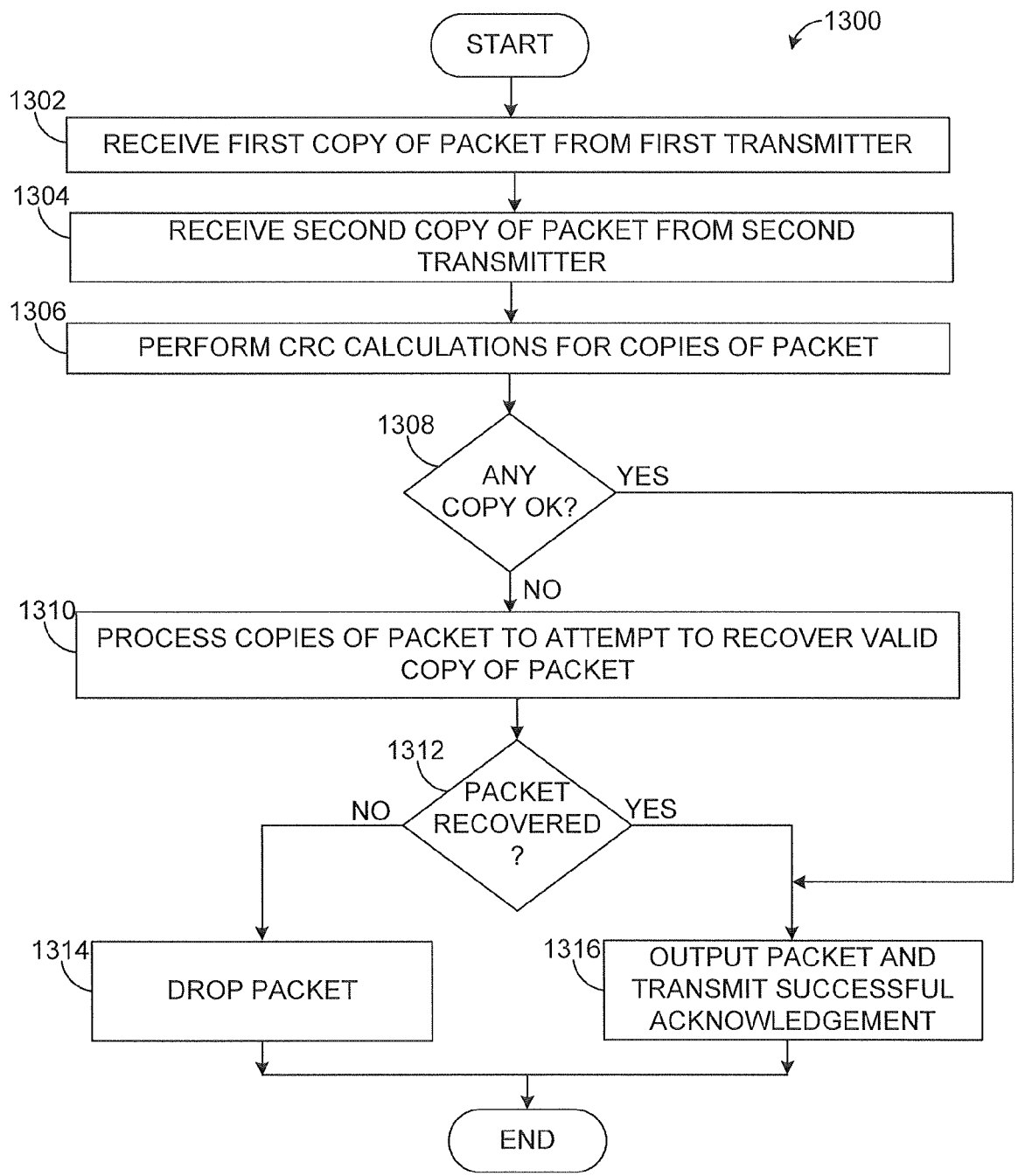

Finally, the techniques described above have often assumed that a single transmitter is being used to transmit a data packet. However, it is also possible to have multiple transmitters transmitting the same data packet to a receiver. For example, a leaf node could be served by multiple infrastructure nodes, where those infrastructure nodes transmit the same data packet to the leaf node simultaneously or at different times. As shown in FIG. 13, a method 1300 includes receiving first and second copies of a data packet from different transmitters at steps 1302-1304. CRC or other error-correction calculations are performed at step 1306, and a determination is made whether any copy of the data packet is valid at step 1306. If not, steps 1310-1316 can be performed to process the received copies of the packet and attempt to recover a valid packet (similar to steps 414-420 in FIG. 4). Note that the receipt of transmissions from multiple transmitters could be used in conjunction with other methods (such as those shown in FIGS. 10 and 11) and is not limited to use with the method 400 of FIG. 4.

Although FIGS. 3 through 13 illustrate example methods, techniques, and related details for improved reliability of wireless communications using packet combination-based error correction, various changes may be made to FIGS. 3 through 13. For example, while various figures illustrate methods containing different series of steps, various steps in each figure could overlap, occur in parallel, occur multiple times, or occur in a different order. Also, other combinations of the techniques shown above could be used, and features of one technique could be incorporated into one or more other techniques.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving a first message transmitted wirelessly, the first message containing a first copy of a data packet and having at least one error;
receiving a second message transmitted wirelessly, the second message containing a second copy of the data packet and having at least one error;
identifying a set of bit positions based on where the first and second copies of the data packet differ;
modifying the set of bit positions to produce a modified set of bit positions;
modifying one or more bit values in the modified set of bit positions to produce at least one modified copy of the data packet; and
determining if the at least one modified copy of the data packet is error-free.

2. The method of claim 1, wherein:
identifying the set of bit positions comprises generating an XOR result using the first and second copies of the data packet; and
modifying the set of bit positions comprises using one or more rules to remove one or more bit positions from the set of bit positions to form the modified set of bit positions.

3. The method of claim 2, wherein modifying the one or more bit values comprises inserting one or more unique combinations of bit values into the modified set of bit positions.

4. The method of claim 1, wherein:
identifying the set of bit positions comprises generating an XOR result using the first and second copies of the data packet; and
modifying the set of bit positions comprises using error-correction calculations to add one or more additional bit positions to the set of bit positions to form the modified set of bit positions.

5. The method of claim 4, wherein modifying the one or more bit values comprises inserting unique combinations of bit values into the modified set of bit positions until either (i) one of the modified copies of the data packet is determined to be error-free or (ii) all unique combinations of bit values have been used.

6. The method of claim 1, further comprising:
dividing each of the first and second copies of the data packet into multiple sub-packets; and
combining different combinations of sub-packets to form multiple reconstructed data packets;
wherein identifying the set of bit positions comprises generating an XOR result using the reconstructed data packets.

7. The method of claim 1, wherein receiving the first message and receiving the second message comprise receiving the first and second messages substantially simultaneously using multiple wireless radios.

8. The method of claim 1, wherein receiving the first message and receiving the second message comprise receiving the first message from a first transmitter and receiving the second message from a second transmitter.

9. An apparatus comprising:
at least one wireless radio configured to receive a first message containing a first complete copy of a data packet and a second message containing a second complete copy of the data packet; and
a controller configured to produce an error-free copy of the data packet by:
identifying a set of bit positions based on where the first and second copies of the data packet differ;
modifying one or more bit values in the set of bit positions to produce at least one modified copy of the data packet; and
determining if the at least one modified copy of the data packet is error-free.

10. The apparatus of claim 9, wherein:
the controller is further configured to use one or more rules to remove one or more bit positions from the set of bit positions to form a modified set of bit positions; and
the controller is configured to modify the one or more bit values in the modified set of bit positions.

11. The apparatus of claim 9, wherein multiple wireless radios are configured to receive the first and second messages substantially simultaneously from a single transmitter.

12. The apparatus of claim 9, wherein the at least one wireless radio is configured to receive the first and second messages from multiple transmitters.

13. An apparatus comprising:
at least one wireless radio configured to receive a first message containing a first complete copy of a data packet and a second message containing a second complete copy of the data packet; and
a controller configured to produce an error-free copy of the data packet by:
dividing each of the first and second copies of the data packet into multiple sub-packets;
combining the sub-packets into at least one reconstructed data packet; and
determining if the at least one reconstructed data packet is error-free.

14. An apparatus comprising:
at least one wireless radio configured to receive a first message and a second message; and
a controller configured to produce an error-free copy of a data packet using the first and second messages;
wherein the first message contains a complete copy of the data packet; and
wherein the second message contains a portion of the data packet, the second message smaller than the first message.

15. The apparatus of claim 14, wherein:
the controller is further configured to initiate transmission of a response to a transmitter that provided the first message, the response containing information identifying a location of one or more errors in the complete copy of the data packet; and
the portion of the data packet contained in the second message is based on the response.

16. The apparatus of claim 15, wherein the response comprises a remainder value determined using cyclic redundancy check (CRC).

17. A non-transitory computer readable medium embodying a computer program, the computer program comprising:
computer readable program code for receiving a first message, the first message containing a data packet;
computer readable program code for receiving a second message, the second message containing a portion of the data packet, the second message smaller than the first message; and
computer readable program code for producing an error-free copy of the data packet by combining the data packet from the first message and the portion of the data packet from the second message.

18. The computer readable medium of claim 17, further comprising:
computer readable program code for sending a response to a transmitter that provided the first message, the response containing information identifying a location of one or more errors in the data packet;
wherein the portion of the data packet contained in the second message is based on the response.

19. The computer readable medium of claim 17, wherein the computer readable program code for receiving the second message comprises computer readable program code for receiving the second message at a lower bit rate compared to the first message.

20. A method comprising:
receiving a first message transmitted wirelessly, the first message containing a first copy of a data packet;
receiving a second message transmitted wirelessly, the second message containing a second copy of the data packet;
identifying a set of bit positions based on where the first and second copies of the data packet differ;
modifying one or more bit values in the set of bit positions to produce at least one modified copy of the data packet; and
determining if the at least one modified copy of the data packet is error-free.

21. A method comprising:
receiving a first message transmitted wirelessly, the first message containing a first copy of a data packet;
receiving a second message transmitted wirelessly, the second message containing a second copy of the data packet;
dividing each of the first and second copies of the data packet into multiple sub-packets;
combining the sub-packets into at least one reconstructed data packet; and
determining if the at least one reconstructed data packet is error-free.

* * * * *